United States Patent [19]
Kakizaki et al.

[11] Patent Number: 5,637,985
[45] Date of Patent: Jun. 10, 1997

[54] ALTERNATOR CONTROL SYSTEM

[75] Inventors: Shieaki Kakizaki, Sendai; Tetsushi Hosokai; Tetsuro Takaba, both of Kure; Hiroshi Ninomiya, Miyano, all of Japan

[73] Assignee: Mazda Motor Corporation, Hiroshima, Japan

[21] Appl. No.: 996,818

[22] Filed: Dec. 28, 1992

[30] Foreign Application Priority Data

Dec. 25, 1991 [JP] Japan .................. 3-343507

[51] Int. Cl.⁶ .................................. H02J 7/14
[52] U.S. Cl. .................. 322/28; 322/18; 322/29; 322/33; 320/64
[58] Field of Search .................. 322/28, 33, 25, 322/27

[56] References Cited

U.S. PATENT DOCUMENTS

| | | | |
|---|---|---|---|
| 4,143,280 | 3/1979 | Kuehn, Jr. et al. | 290/9 |
| 4,563,631 | 1/1986 | Mashino et al. | 322/33 |
| 4,634,954 | 1/1987 | Kato et al. | 322/28 |
| 4,659,977 | 4/1987 | Kissel et al. | 320/64 |
| 4,945,299 | 7/1990 | Watanabe | 322/33 |
| 5,198,744 | 3/1993 | Kohl et al. | 322/33 |
| 5,216,350 | 6/1993 | Judge et al. | 322/25 |
| 5,231,344 | 7/1993 | Marumoto et al. | 322/14 |
| 5,256,959 | 10/1993 | Nagano et al. | 322/25 |
| 5,262,711 | 11/1993 | Mori et al. | 322/28 |
| 5,266,882 | 11/1993 | Morishita | 322/28 |
| 5,270,575 | 12/1993 | Togai et al. | 290/40 C |

FOREIGN PATENT DOCUMENTS

| | | |
|---|---|---|
| 60-106338 | 6/1985 | Japan . |
| 5-176477 | 10/1993 | Japan . |

*Primary Examiner*—Steven L. Stephan
*Assistant Examiner*—Nicholas Ponomarenko
*Attorney, Agent, or Firm*—Keck, Mahin & Cate

[57] ABSTRACT

An alternator control system controls a field current passing an alternator so as to regulate a terminal voltage of a vehicle battery to a target voltage, based on a deviation of the terminal voltage from the target voltage, by feedback control. The field current is corrected based on a delay in current generation of the alternator.

17 Claims, 6 Drawing Sheets

ALTERNATOR CONTROL SYSTEM

BACKGROUND OF THE INVENTION

1. Field of the Invention

The present invention relates to an improvement in an alternator control system to control a terminal voltage of a vehicle battery.

2. Description of Related Art

In an alternator control system, described, for instance, in Japanese Unexamined Patent Publication No. 60-106338, for controlling an alternator, the voltage of a vehicle battery, charged by the alternator, is feedback controlled so as to maintain an established or required voltage. In the process of the battery voltage feed-back control, a terminal voltage of the vehicle battery is compared against the established or required voltage, and if the battery voltage falls below the required voltage, a transistor is activated at a proper duty rate so as to provide a field current to the alternator's three-phase field coil to replenish the battery's charge. Conversely, if the battery voltage becomes above the required voltage, the transistor is de-activated to allow the vehicle battery to discharge.

When exercising the feedback control of field current according to the deviation between the battery voltage and the required voltage so as to closely align the battery voltage with the required voltage, although a field current is applied to the field coil to produce a generated current, proportional to the field current, through the armature coil, even if applying an accurate field current, its actual wave form becomes deformed or distorted due to great interference of inductance of the field coil. Conventionally, as shown in FIG. 11, in the event that a field current changes, even though a required field current is established as depicted by a solid line, an actual field current causes a delay of change, as depicted by a dotted broken line, which is followed by a corresponding delay of change in generated current of the armature coil. This results in a drop in actual voltage of the vehicle battery, as depicted by a solid line, from a required voltage depicted by a broken line. This leads to an accompanying decline in control performance when the alternator changes its load and/or its speed of rotation.

SUMMARY OF THE INVENTION

It is an objective of the present invention to provide an alternator control system for performing a precise control of actual field current so as to regulate an actual field current to a necessary field current in spite of inductance of the field coil of the alternator, thereby regulating a terminal voltage of a vehicle battery closely to a target voltage.

The foregoing object is accomplished by providing an alternator control system for controlling an alternator to regulate a field current passing the field coil so as to regulate a terminal voltage of a vehicle battery, in which the field current is corrected in accordance with a delay in current generation of the alternator.

The alternator control system includes a feedback control means which establishes a target voltage of the vehicle battery based on an air temperature, for example the temperature of intake air introduced into an air intake system of an vehicle engine, feedback controls a field current supplied to the field coil of the alternator based on both the terminal voltage and the target voltage, and then makes a correction of the field current based on a delay in current generation of the alternator. For the correction of the field current, a target generated current of the alternator is calculated based on a deviation of the terminal voltage from the target voltage, and then a target field current is calculated based on both the target generated current and a rotational speed of the alternator, or otherwise a rotational speed of an engine output shaft. After making an estimation of an actual field current expected to pass through the field coil based on the target field current, the target field current is corrected in accordance with a deviation of the target field current from the expected actual field current in linear advance correction. Specifically, the estimation of the expected actual field current is made by a linear weighted averaging of the target field current.

According to the alternator control system of the present invention, the field current of the alternator is adjusted to correct a delay in current generation of the alternator caused by inductance of the field coil. This offsets or compensates a delay of change in field current, which is due to inductance of the field coil, bringing the actual field current closely to its target or required current. Consequently, the generated current of the alternator rapidly changes to conform with the required current, so that the battery voltage is accurately feedback controlled over to the required voltage, notwithstanding fluctuations in electric load and/or rotational speed of the alternator.

Moreover, according to the alternator control system of the present invention, the target field current is calculated as a preferred current based on the target current. Since the target field current is corrected with the target field current and the actual estimated field current by a linear advance correction, the current actually flowing across the field coil almost corresponds with the target field current. As a result, even if changes in field current occur, the voltage of the vehicle battery can be precisely feedback controlled.

In this instance, the estimated field current is calculated by means of linear weighted averaging, so that it is quite precise.

BRIEF DESCRIPTION OF THE DRAWINGS

The above and other objects and features of the present invention will be clearly and precisely understood from the following description of preferred embodiments thereof when considered in conjunction with the accompanying drawings, in which.

DETAILED DESCRIPTION OF THE PREFERRED EMBODIMENT

Because alternators are well known to those skilled in the art, the present description will be directed in particular to elements forming part of, or cooperating directly with, a system in accordance with the present invention. It is to be understood that elements not specifically shown or described can take various forms well known to those skilled in the alternator art.

Figure 1:
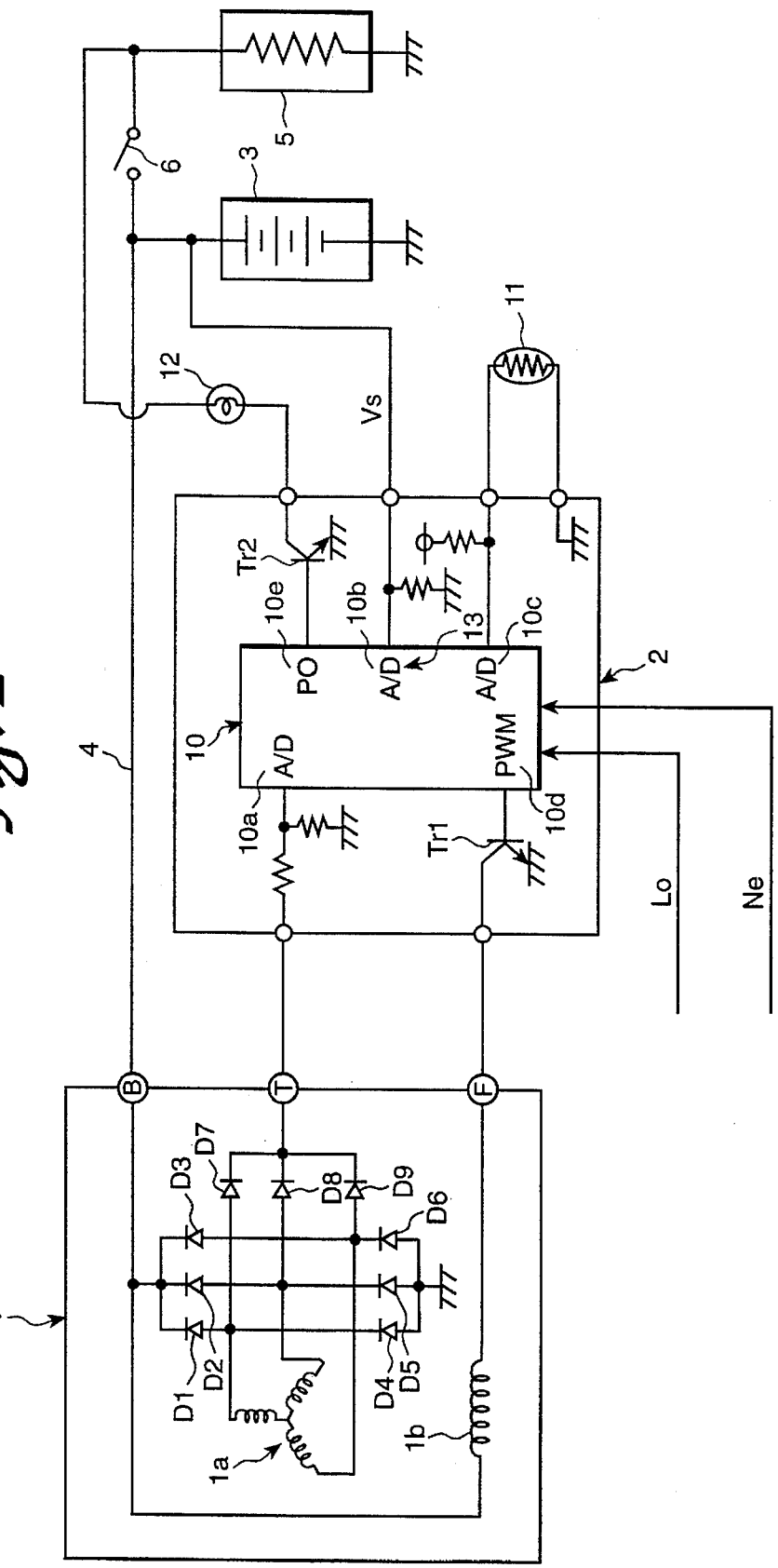
FIG. 1 is a circuit diagram of an alternator control system in accordance with a preferred embodiment of the present invention.

Referring to the drawings in detail and, in particular, to FIG. 1 showing an alternator control system in accordance with a preferred embodiment of the present invention for controlling an alternator mounted on an automobile, an alternator 1 generates alternating current, and is operationally connected to an output shaft of an engine, such as a crankshaft (not shown). The alternator is internally composed of a three-phase armature coil 1a, a plurality of, such as nine, rectifier diodes D1–D9, and a field coil 1b. A controller or regulator 2, which regulates the current generated by the alternator 1, is connected between the alternator 1 and a vehicle battery 3. The vehicle battery 3 is charged by the alternator 1 through an electric supply harness 4. Represented by a number 5 are the electric elements, such as power assisted windows and/or a rear window defrost wiring, as electric load, which are coupled through an ignition switch 6 to the vehicle battery 3.

The regulator 2 is equipped with an internal duty controlled transistor Tr1 to regulate electricity passing to the field coil 1b of the alternator 1, and a control unit 10 which has an internal central processing unit (CPU) comprising a microcomputer. A signal of an internally generated voltage, which passes through rectifying diodes D7–D9 of the alternator 1 is input to an A/D terminal 10a of the control unit 10. At the same time, a terminal voltage Vs of the vehicle battery 3 is impressed upon another A/D terminal 10b of the control unit 10. In addition, the regulator 2 receives at another A/D terminal 10c a signal representative of the temperature of air (At) around the vehicle such as intake air, which is detected by an air intake temperature sensor 11 and/or an electric load (Lo) of the alternator 1, and establishes the target voltage (Vreg) of the vehicle battery 3 on the basis of the estimated temperature of air. The target voltage (Vreg) is set lower when the temperature of intake air is high than when it is low. On the other hand, the target voltage (Vreg) is set higher when the alternator 1 is under electric loads than when it is off electric loads. The regulator 2 is further connected at a PWM terminal 10d with the base of the duty controlled transistor Tr1, and at a PC terminal 10e with the base of a transistor Tr2 for controlling turning on and off a warning light 12.

Figure 2:
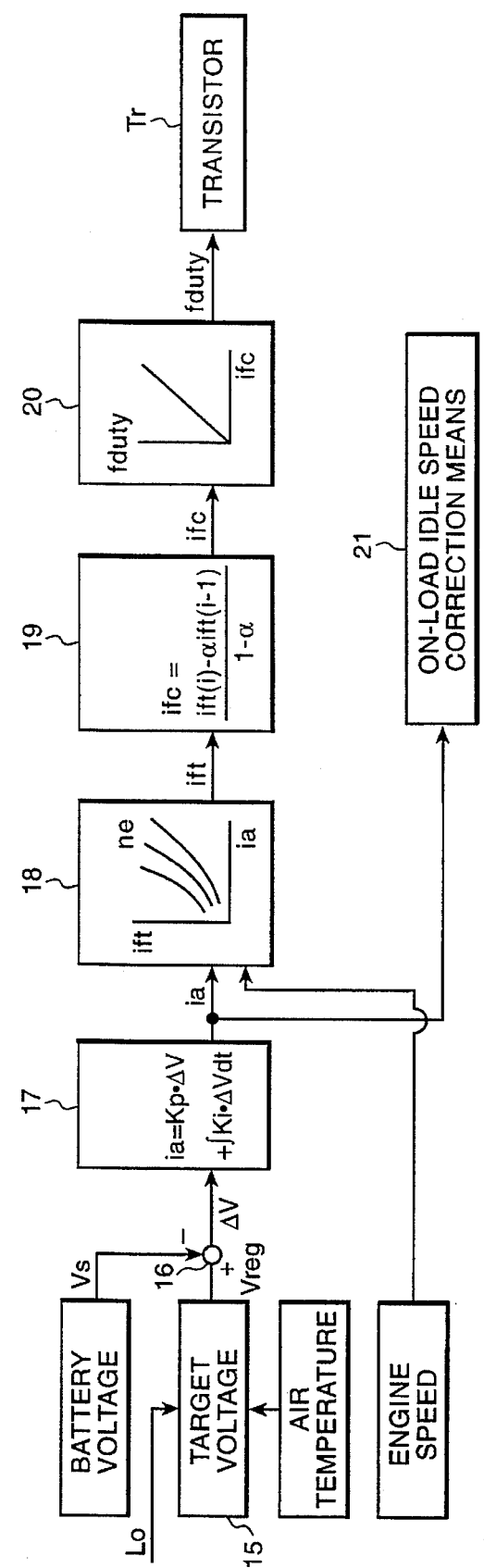
FIG. 2 is a block diagram showing a generated current feedback control for an alternator.

Referring to FIG. 2, which is a block diagram showing the current generation control of the alternator 1, a target voltage establishment means 15 estimates the temperature of electrolytic fluid of the vehicle battery 3 on the basis of the temperature of intake air detected by an intake air temperature sensor 11 and establishes the target voltage (Vreg) of the vehicle battery 3 on the basis of the estimated temperature of electrolytic fluid. A subtractor 16 subtracts a terminal voltage (Vs) of the vehicle battery 3 from the target voltage (Vreg) established by the target voltage establishment means 15. A current establishment means 17 establishes a target current (ia) of the alternator 1 which is generated by proportional-integration control. The target current (ia) is calculated by the use of the following equation:

$$ia = Kp \times \Delta V + Ki \times \Delta V dt$$

where $\Delta V$ is a voltage deviation the target voltage Vreg from terminal voltage Vs obtained by means of the subtractor 16, Ne is a rotational speed of the alternator 1 as engine speed in revolution, Kp is a proportional constant, and Ki is an integral constant.

After the current establishment means 17 there is a target field current calculation means 18 which calculates the target field current (ift) based on the target current (ia) and the engine speed (Ne) previously memorized as a field current map. A control field current calculation means 19 performs a linear advance correction or adjustment of the calculated target field current (ift) by the target field current calculation means 18 to provide a control field current (ifc). Based on the control field current (ifc), a control duty rate calculation means 20 seeks a control duty (fduty) corresponding to the control field current (ifc) and outputs a signal of the control duty rate (fduty) to the base of the duty controlled transistor Tr1. In the diagram, there is provided an on-load idle speed correction means 21 for adjusting an idle speed while the engine is idling under the activated load 5 on the basis of the target current (ia) established by the target generated current establishment means 17. A test switch, not depicted in the drawing, is attached to the regulator 2. When the test switch is actuated, the duty controlled transistor Tr1 is controlled at the duty rate (fduty) so as to maintain the established field current of the field coil 1b.

Figure 3:
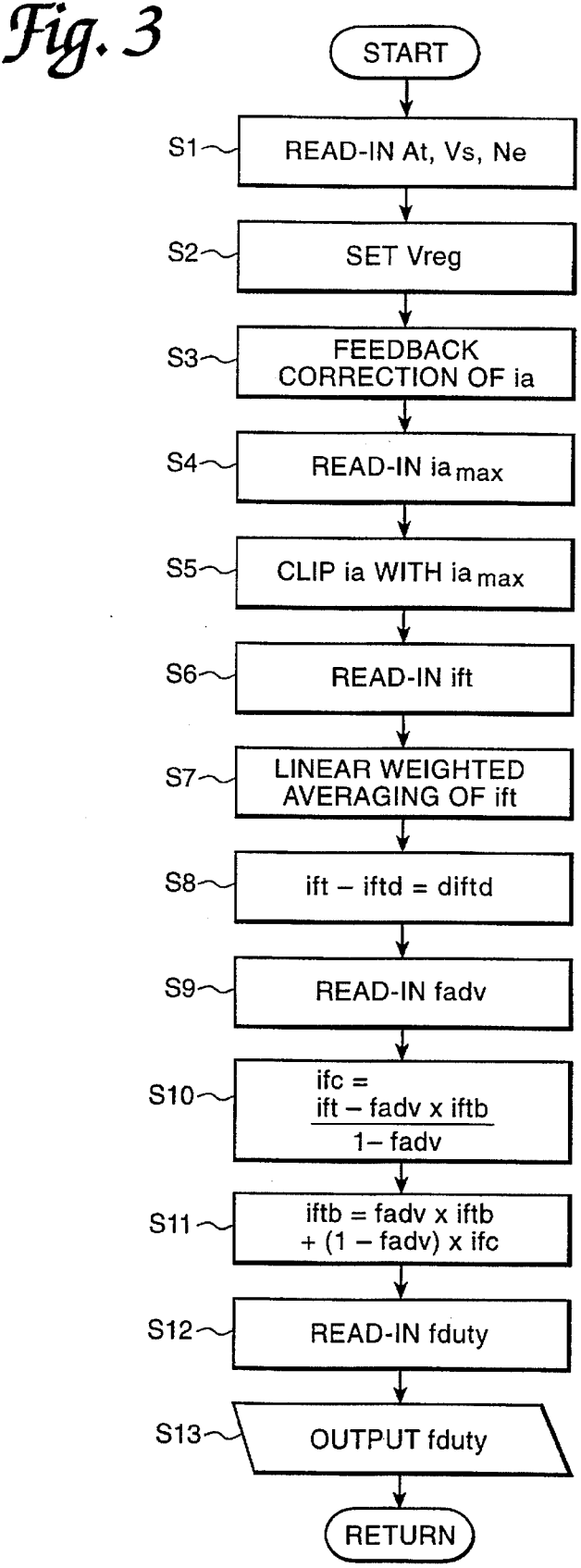
FIG. 3 is a flow chart illustrating a generated current feedback control sequential routine for a microcomputer of the alternator control system.
Figure 4:
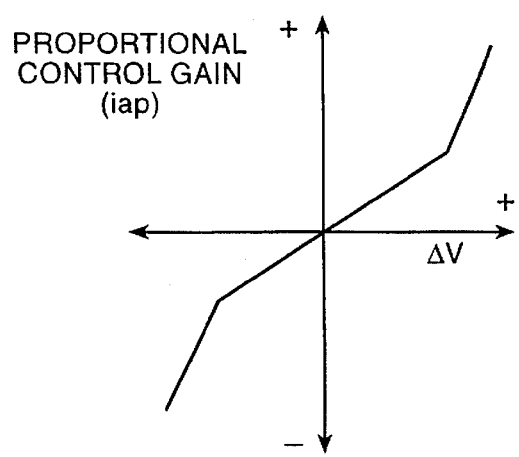
FIG. 4 is a proportional control gain map used in the generated current feedback control sequential routine shown in FIG. 3.
Figure 5:
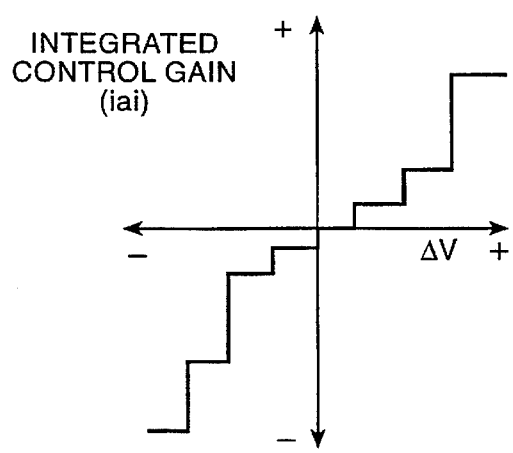
FIG. 5 is an integrated control gain map used in the generated current feedback control sequential routine shown in FIG. 3.

Referring to FIG. 3, which is a flow chart illustrating the current generation control sequential routine of the alternator for a microcomputer of the control unit 10 of the regulator 2, the first step in step S1 is to read in data relating to an intake air temperature (At), a terminal voltage (Vs) of the vehicle battery 3, and an engine speed (Ne). Then, a calculation is performed in step S2 to correct the target voltage (Vreg) of the vehicle battery 3 on the basis of the intake air temperature (At). Another calculation is conducted to calculate a voltage deviation ($\Delta V$) of the terminal voltage (Vs) from the target voltage (Vreg). In step S3, a target current (ia) of the alternator 1, established by the target generated current establishment means 17, is feedback controlled based on gains, i.e. a proportional control gain ($i_{ap}$) and a integrated control gain ($i_{ai}$), determined in accordance with the voltage deviation ($\Delta V$) of the terminal voltage (Vs) from the target voltage (Vreg) established in a proportional gain map and an integrated gain map shown in FIGS. 4 and 5, respectively. In this instance, the control gain maps shown in FIG. 4 and 5, respectively, establish control gains so as to proportionally increase, that is, become larger as the voltage deviation ($\Delta V$) becomes large.

Figure 6:
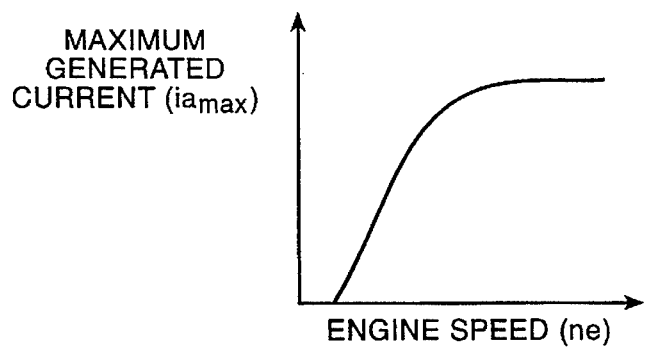
FIG. 6 is a graph of a maximum generated current of the alternator relative to its rotational speed.

In order to prevent the target current (ia) from exceeding a maximum current possibly generated by the alternator 1, steps S4 to S6 take place. That is, after reading in a maximum target current ($ia_{max}$) from a memorized table of maximum target current with respect to engine speed (Ne), in FIG. 6, in step S4, the target current (ia) is clipped by the maximum target current ($ia_{max}$) in step S5. A target field current (ift) is read in from a target field current map, shown in FIG. 7, according to the target current (ia) and the engine speed (Ne) in step S6. In this instance, as is apparent from the target field current map, since the current generated by the alternator 1 is proportional to both field current and alternator speed or engine speed (Ne), the greater the alternator speed or engine speed (Ne) is and/or the greater the target current is, the greater the target field current (ift) has been set.

Figure 10:
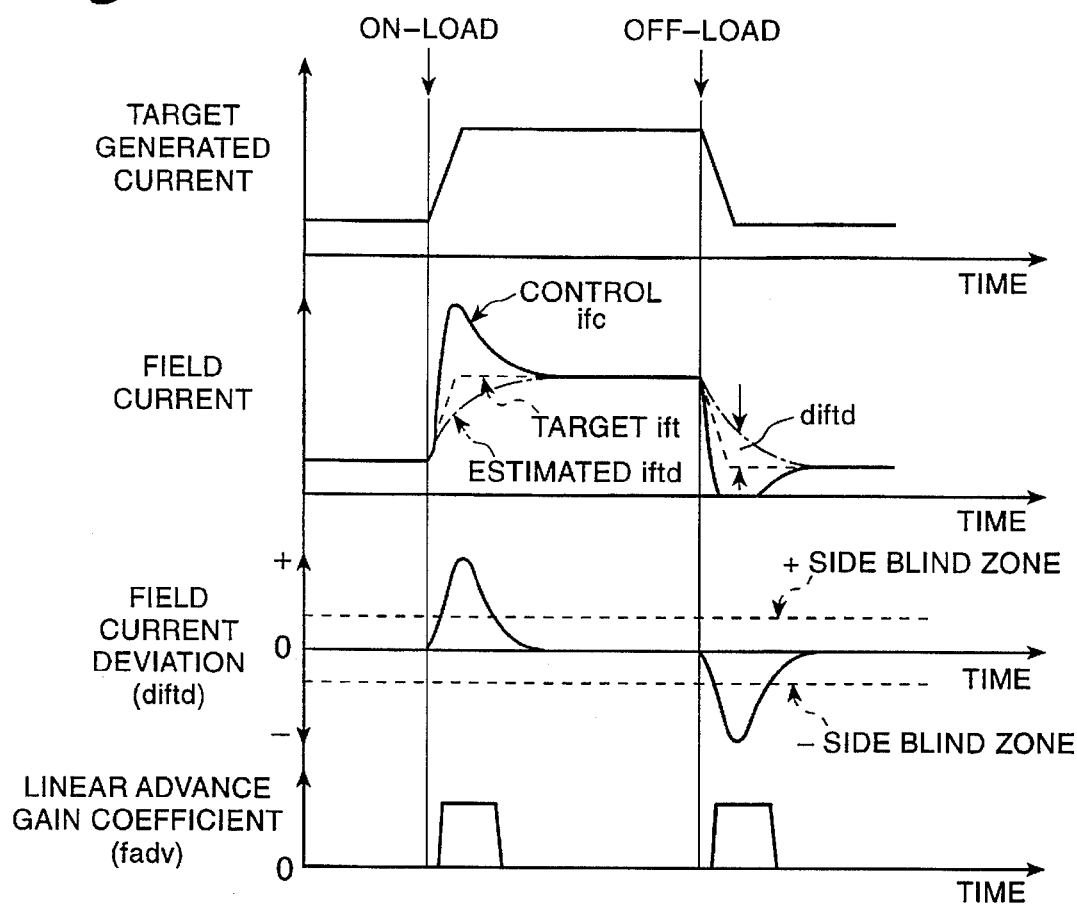
FIG. 10 is a time chart illustrating operation of the alternator control system.
Figure 11:
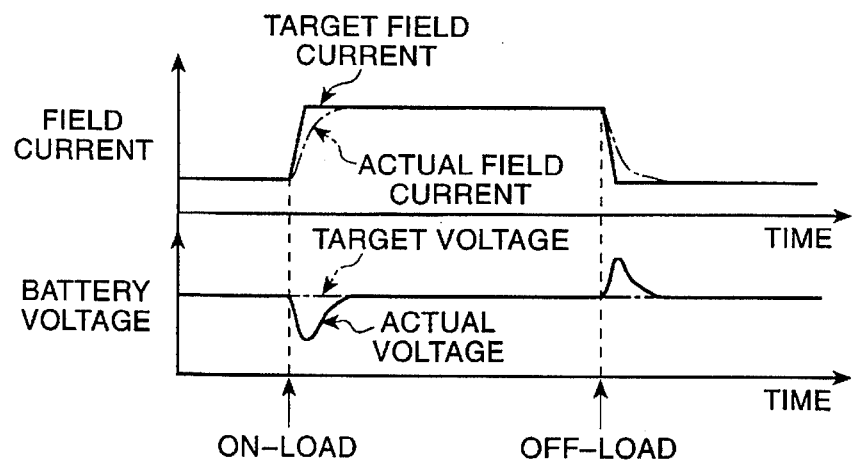
FIG. 11 is a time chart illustrating operation of a prior art alternator control system.

Subsequently, in step S7, through the accomplishment of linear weighted averaging of the target field current (ift) by the use of the equation below, an expected field current (iftd) is calculated (see FIG. 10), which is one that actually flows when the duty controlled transistor Tr1 is controlled in accordance with the target field current (ift).

$$iftd = KFLPF \times ift + (1-KFLPF) \times ift$$

Figure 8:
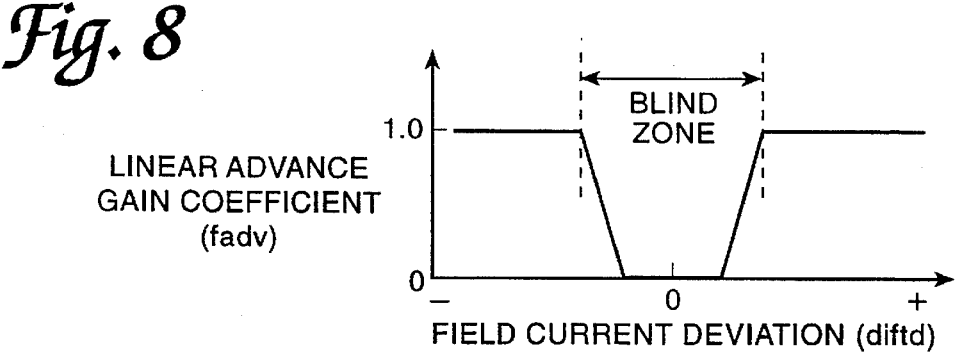
FIG. 8 is a map of a linear advance gain co-efficient.

After calculating the field current deviation (diftd) of the target field current (ift) from the expected field current (iftd) in step 8, a linear advance gain co-efficient (fadv), which is between 0 (zero) and 1 (one), of the field current is read-in from a gain advance coefficient table (see FIG. 8), in accordance with the field current deviation (diftd) in step S9. In step S10, a target control field current (ifc) (see FIG. 10), which must flow through the field coil 1b is calculated based on the linear advance gain coefficient (fadv), the target control field current (ift) and the corrective field current (iftb), which will be described later, from the following equation which is an inverse function of expected field current (iftd):

$$ifc = (ift - fadv \times iftb)/(1-fadv)$$

When the control field current (ifc) has been obtained, the corrective field current (iftb) is calculated from the equation in step S11:

$$iftb = fadv \times iftb + (1-fadv) \times ifc$$

Figure 9:
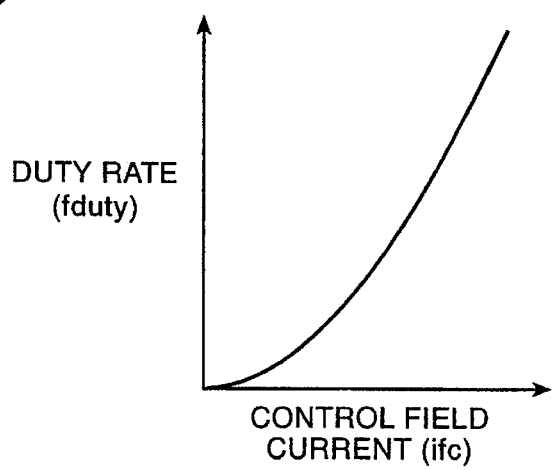
FIG. 9 is a graph of control duty rate relative to alternator's field current.

After reading-in a control duty rate (fduty) corresponding to the control field current (ifc) from a duty rate table shown in FIG. 9, in Step S12, the transistor Tr1 is duty controlled at the duty rate (fduty) in Step 13. Then, the step orders return to its original state.

Figure 7:
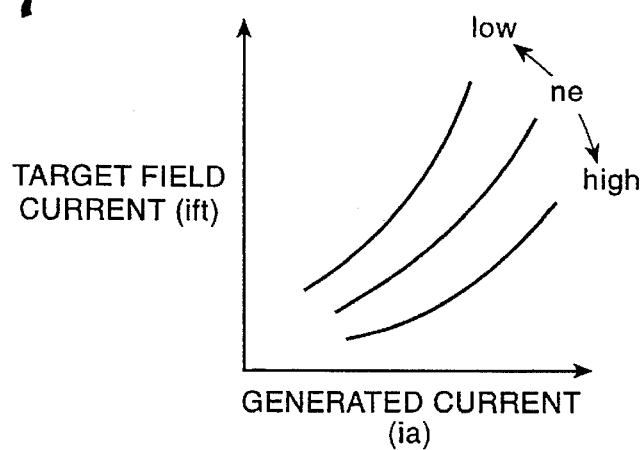
FIG. 7 is a graph of a target field current of an alternator relative to its speed and generated current.

As apparent from the above, after the generated current (ia) of the alternator i is corrected by feedback control with using both the proportional control gain (iap) and the integral control gain (iai) in correspondence with the voltage deviation (ΔV) of the terminal voltage (Vs) from the target voltage (Vreg) of the vehicle battery 3, it is substituted by a target field current (if) on the basis of the map shown in FIG. 7. A control duty rate (fduty) is obtained by the duty rate calculation means 20. By activating the transistor Tr1 at the control duty rate (fduty), the target field current (ift) of the alternator i is feedback controlled on the basis of the voltage deviation (ΔV) of the terminal voltage (Vs) from the target voltage (Vreg) of the vehicle battery 3. The target field current (ift) is corrected according to the delay in current generation of the alternator 1.

Furthermore, the generated current (ia) of the alternator 1 is corrected by means of the proportional and integral control gains (iap) and (iai), both of which correspond to the voltage deviation (ΔV) between the terminal voltage (Vs) of the vehicle battery and the target voltage (Vreg). At the same time, the target field current (ift) is calculated on the basis of the corrected generated current (ia) and the speed of the alternator 1, which is substituted by an engine speed (Ne). The calculated target field current (ift) is then subjected to a linear weighted averaging step so as to estimate an expected field current (iftd). Finally, a linear advance correction is applied to the target field current (ift) according to the current deviation (diftd) between the target field current (ift) and the expected field current (iftd) so as to obtain an actual control field current (ifc).

In the embodiment described above, as is shown in FIG. 10, along with activating and de-activating the battery load, the target generated current (ia) of the alternator 1 may sustain either great or small change. However, even when changes occur in the target field current (ift) shown by a broken line according to the change in target generated current (ia), if a duty rate renewal cycle in the feedback control is longer than the time constant of inductance of the field coil 1b, the field current which actually flows to the field coil 1b is generated accompanying a time delay in raise or fall due to the inductance. However, the actual field current is estimated as shown by a dotted-oblique line in FIG. 10, and the target field current (ift) is subjected to a linear advance correction according to the current deviation (aiftd) between the expected field current (iftd) and the target field current (ift), so as to establish a control field current (ifc) as shown by a solid line in FIG. 10. The transistor Tr1 is duty controlled to provide the control field current (ifc), so that an actual field current, which actually flows to the field coil 1b of the alternator 1, substantially equals the target field current (ift) shown by a broken line in FIG. 10. Consequently, compensation is made for the time delay stemming from changes in field current due to delay current generation of the alternator 1 which is caused by means of inductance of the field coil 1b. As a result, even if the alternator 1 is activated with or without an electric load, it generates and changes a generated current without delay, and consequently, the terminal voltage of the vehicle battery 3 is well controlled to correspond with the target voltage.

It is to be understood that although the present invention has been described in detail with respect to preferred embodiments thereof, various other embodiments and variants may occur to those skilled in the art. Such other embodiments and variants fall in the scope and spirit of the invention and are intended to be covered by the following claims.

What is claimed is:

1. An alternator control system for controlling an alternator to regulate a field current passing through a field coil of the alternator so as to regulate a terminal voltage of a battery comprising:

terminal voltage detecting means for detecting a terminal voltage of the battery; and control means for (1) establishing a target voltage of the battery, (2) estimating a target field current to the field coil based on both said terminal voltage and said target voltage in a feedback control, (3) performing a correction of said field current to compensate a delay in current generation of the alternator by linear advance correction, and (4) applying a corrected field current to the field coil.

2. An alternator control system as defined in claim 1, wherein said control means performs said correction of said field current based on a previous actual field current and said target field current by making an estimation of the previous actual field current expected to pass through the field coil in a previous control cycle.

3. An alternator control system as defined in claim 1, wherein said control means performs said correction of said field current based on an actual field current expected to pass through the field coil and said target field current by calculating said actual field current by a linear weighted averaging of said target field current.

4. An alternator control system as defined in claim 1, and further comprising temperature detecting means for detecting an air temperature, wherein said control means establishes said target voltage of the battery based on said air temperature detected by said temperature detecting means.

5. An alternator control system as defined in claim 4, wherein said temperature detecting means detects the temperature of intake air introduced into an air intake system of an engine.

6. An alternator control system as defined in claim 1, and further comprising speed detecting means for detecting a rotational speed of the alternator, wherein said control means estimates said target field current by calculating a target generated current of said alternator based on a deviation of said terminal voltage from said target voltage, and calculating said estimated target field current based on a rotational speed of said alternator and said target generated current.

7. An alternator control system as defined in claim 6, wherein said speed detecting means comprises a speed sensor for detecting a rotational speed of an engine output shaft as a rotational speed of the alternator.

8. An alternator control system as defined in claim 2, and further comprising speed detecting means for detecting a rotational speed of the alternator, wherein said control means estimates said target field current by calculating a target generated current of said alternator based on a deviation of said terminal voltage from said target voltage, and calculating said estimated target field current based on a rotational speed of said alternator and said target generated current.

9. An alternator control system as defined in claim 3, and further comprising speed detecting means for detecting a rotational speed of the alternator, wherein said control means estimates said target field current by calculating a target generated current of said alternator based on a deviation of said terminal voltage from said target voltage, and calculating said estimated target field current based on a rotational speed of said alternator and said target generated current.

10. An alternator control system as defined in claim 3, wherein said control means further performs said correction of said field current based on a deviation of said actual field current expected to pass through the field coil and said target field current.

11. An alternator control system as defined in claim 6, wherein said control means calculates said estimated target field current so as to provide an increase in said estimated target field current with one of an increase in said target generated current and a decrease in said rotational speed of said alternator.

12. An alternator control system as defined in claim 8, wherein said control means calculates said estimated target field current so as to provide an increase in said estimated target field current with one of an increase in said target generated current and a decrease in said rotational speed of said alternator.

13. An alternator control system as defined in claim 9, wherein said control means calculates said estimated target field current so as to provide an increase in said estimated target field current with one of an increase in said target generated current and a decrease in said rotational speed of said alternator.

14. An alternator control system for controlling an alternator to regulate a field current passing through a field coil of the alternator so as to regulate a terminal voltage of a battery connected to the alternator comprising:

terminal voltage detecting means for detecting a terminal voltage of the battery;

speed detecting means for detecting a rotational speed of the alternator; and control means for establishing a target voltage of the battery, calculating a target generated current of the alternator based on a deviation of said terminal voltage from said target voltage, calculating said field current based on a rotational speed of said alternator detected by said speed detecting means and said target generated current, and applying said field current to the field coil.

15. An alternator control system as defined in claim 14, wherein said control means calculates said field current so as to provide an increase in said field current with one of an increase in said target generated current and a decrease in said rotational speed of said alternator.

16. An alternator control system as defined in claim 14, wherein said speed detecting means comprises a speed sensor for detecting a rotational speed of an engine output shaft as said rotational speed of the alternator.

17. An alternator control system as defined in claim 15, wherein said speed detecting means comprises a speed sensor for detecting a rotational speed of an engine output shaft as said rotational speed of the alternator.

* * * * *